(12) United States Patent
Dinwiddie et al.

(10) Patent No.: US 6,195,078 B1
(45) Date of Patent: Feb. 27, 2001

(54) PARALLEL MODE ON-SCREEN DISPLAY SYSTEM

(75) Inventors: Aaron Hal Dinwiddie; Michael David Landis, both of Fishers, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/000,300

(22) PCT Filed: Aug. 21, 1996

(86) PCT No.: PCT/US96/13697

§ 371 Date: Jan. 27, 1998

§ 102(e) Date: Jan. 27, 1998

(87) PCT Pub. No.: WO97/08890

PCT Pub. Date: Mar. 6, 1997

(51) Int. Cl.[7] .................................... G09G 5/00
(52) U.S. Cl. ............... 345/114; 345/115; 345/116; 345/141; 345/192; 345/193; 345/199
(58) Field of Search .................... 345/114, 115, 345/116, 141, 199, 192, 193, 112; 348/600

(56) References Cited

U.S. PATENT DOCUMENTS

| 4,451,840 | * | 5/1984 | Shanley, II | 348/600 |
| 4,467,322 | * | 8/1984 | Bell et al. | 345/114 |
| 4,628,479 | | 12/1986 | Borg et al. | 364/900 |
| 4,703,322 | * | 10/1987 | Goss et al. | 345/114 |
| 5,248,964 | * | 9/1993 | Edgard et al. | 345/114 |
| 5,420,609 | * | 5/1995 | Izzi et al. | 345/190 |
| 5,430,465 | * | 7/1995 | Sabella et al. | 345/199 |
| 5,712,663 | * | 1/1998 | Matsumoto | 345/195 |

FOREIGN PATENT DOCUMENTS

| 149780 | 11/1984 | (EP) . |
| 395916 | 9/1990 | (EP) . |
| 93/21623 | 10/1993 | (WO) . |

OTHER PUBLICATIONS

Proceedings of the International Conference on Consumer Electronics (ICCE), Jun. 2–4, 1993 No. Conf. 11, Jun. 2, 1992, Institute of Electrical and Electronics Engineers, H. Blatter "High Performance On–Screen–Display for 1H/2H, Standard and Wide Apsect Ratio TV", pp. 254–255.

* cited by examiner

*Primary Examiner*—Mark Zimmerman
*Assistant Examiner*—Kimbinh T. Nguyen
(74) *Attorney, Agent, or Firm*—Joseph S. Tripoli; Robert D. Shedd

(57) ABSTRACT

An on-screen display generator includes a character buffer containing a plurality of entries, and an attribute buffer also containing a plurality of entries. Each entry in the character buffer has a corresponding entry in the attribute buffer. The entries in the character buffer each specify a display character, and the corresponding entry in the attribute buffer specifies the display attributes of the display character. Control circuitry retrieves corresponding entries from the character and attribute buffers substantially simultaneously, and generates a signal representing the image of the display character specified in the retrieved display character entry having the attributes specified in the retrieved attribute entry.

11 Claims, 4 Drawing Sheets

|  | PIXEL | | | | | | | | |
|---|---|---|---|---|---|---|---|---|---|
|  | 0 | 1 | 2 | 3 | 4 | 5 | 6 | 7 | 8 |
| ROW 0 |  |  |  |  |  |  |  |  |  |
| ROW 1 |  |  |  |  | X | X |  |  |  |
| ROW 2 |  |  |  | X | X | X | X |  |  |
| ROW 3 |  |  | X | X |  |  | X | X |  |
| ROW 4 |  | X | X | X |  |  | X | X | X |
| ROW 5 |  | X | X | X |  |  | X | X | X |
| ROW 6 |  | X | X | X | X | X | X | X | X |
| ROW 7 |  | X | X | X | X | X | X | X | X |
| ROW 8 |  | X | X | X |  |  | X | X | X |
| ROW 9 |  | X | X | X |  |  | X | X | X |
| ROW 10 |  |  |  |  |  |  |  |  |  |
| ROW 11 |  |  |  |  |  |  |  |  |  |
| ROW 12 |  |  |  |  |  |  |  |  |  |

Fig. 2

PARALLEL MODE ON-SCREEN DISPLAY SYSTEM

BACKGROUND OF THE INVENTION

1. Field of the Invention

The present invention relates to on-screen display systems for television display systems.

2. Description of the Prior Art

Current television display systems require some sort of textual on-screen display (OSD) system, for displaying means and closed captioning, for example. High-end television display systems sometimes employ advanced bit-mapped graphic displays for display purposes. However, most television display systems still rely on character-per-cell based graphic displays. Because of cost constraints, most such OSD display systems use a single read/write memory (RAM) buffer. Each RAM buffer is large enough to hold one row of text characters to be displayed across the screen. Codes representing characters to be displayed are stored in the RAM buffer. For example, a processor resident within the television system may store character codes in the RAM buffer representing a menu for interaction with the viewer; or closed captioning circuitry may extract closed captioning information from the received television signal and store character codes in the RAM buffer representing that closed captioning information for display with the received television image.

An OSD generator counts video lines in the current field of the received television video signal, and then operates to display the characters contained in the RAM buffer when the video lines on which those characters are to be displayed are being scanned. At that point, the OSD generator retrieves the character codes from the RAM buffer and generates a signal representing the image of those characters. The picture elements (pixels) making up the OSD characters are looked up in a character read-only memory (ROM) by using the character code read from the RAM buffer, and the video line and pixel locations currently being scanned, to address the character ROM. The circuitry to retrieve character codes from the RAM buffer and to generate the OSD image representative signal is normally synchronized to the received television signal in some manner. The image representative signal thus generated may replace or overlay the received television image. The form of OSD generator described above is termed a serial mode OSD generator. In an alternative embodiment of a serial mode OSD, two RAM buffers are operated as pingpong buffers. One RAM buffer is updated as described above while the OSD generator retrieves data from the other.

In known serial mode OSD generator systems, the RAM buffer normally consists of one byte (i.e. eight bits) per character, allowing for 256 possible characters. However, because the displayed characters are required to be displayed in different colors, and with underlining, italics, etc. (termed attributes) for closed captioning and/or menuing systems, fewer than 256 characters are possible. Each byte in the RAM buffer may contain either display character data or attribute data. The most significant bit (MSB) is used to define whether the remaining seven least significant bits are a display character or attributes (color changes). If the MSB is, for example, a logic '1', the data in this byte specifies a display character. Consequently, it is possible to specify up to 127 display characters.

If the MSB is a logic '1', the data in this byte specifies attributes. An attribute byte specifies either a foreground or background color or another display attribute such as underlining, flashing, italics, etc. Foreground and background colors may either be specified by including respective values of red, green and blue (RGB) color components for the specified color in the attribute byte, or by including an index into a palette table, or possibly into one palette table for foreground colors and another for background colors. The palette table contains entries each specifying a color by including values of respective RGB color component values. When an attribute change occurs (i.e. an attribute type is retrieved from the RAM buffer), a blank space (usually in the current background color) is generated on the display.

A serial mode OSD generator system provides compact memory usage. However, it is impossible to simply change a character's attributes (foreground/background color, etc.) for all the characters in a line of text. In addition, because a blank space is displayed when an attribute change is required, the design of the user interface is greatly inhibited.

One potential way around this problem is to represent every OSD character by 2 sequential bytes in the RAM buffer with a first byte specifying the display character and a second byte specifying that character's attributes. In such a system, when OSD information is written into the RAM buffer, both the display character and it's attributes are written into the memory sequentially. That is, the processor or closed caption circuitry must write two bytes into the RAM buffer for each character to be displayed. The OSD generator, in turn, sequentially retrieves the display character byte and then it's corresponding attribute byte, and generates a signal representing the image of the display character having those attributes. While feasible, this is not ideal from a software standpoint. The software storing the OSD information must continually write both the display character byte and the attribute byte. However, attributes don't change very often, so writing attribute bytes for each display character represents unnecessary processing which must be performed by this software.

Another approach to the problem of generation of characters and their corresponding attributes is described by Edgard, et al. in EP-A-0 395 916 entitled SEPARATE FONT AND ATTRIBUTE DISPLAY SYSTEM which was published Nov. 7, 1990. Edgard, et al. describe a computer system using separate font and attribute buffers. This system, however, is relatively complex and employs different processing depending on whether application programs or sub-routines provided by the computer manufacturer are being executed. For example, during subroutine execution, information stored in registers is written to the attribute buffers when mask information is written to the font buffer. During application program execution, the attribute value is written to a foreground attribute buffer and zero is written to a background buffer while an OR'ed value of the attribute value is written to the font buffer. In subroutine read operations, the value in the font buffer may be obtained or a CRC value may be generated on the entire character cell. The CRC value can be compared with similar CRC values developed on the character mask of interest to determine if a character is present in the cell. During execution of read operations in application programs, the value in the foreground or background buffer is selected based on the value in the font buffer.

A further example of use of separate attribute and character memories is described by Borg, et al. in U.S. Pat. No. 4,626,479 entitled TERMINAL WITH MEMORY WRITE PROTECTION which issued Dec. 9, 1986. In this system, attribute information stored in a RAM separate from character data is utilized for write protection in micro-processor controlled video display terminal. Specifically, unused attribute bits stored in the attribute memory are used to represent a protected field in a character RAM for a given location or address on the video display and are read from the attribute RAM by the microprocessor for restricting access to the character RAM thus providing write protection for selected portions of the video display.

Another example of attribute processing is described by Luck, et al., in EP-A-0 149 780 entitled ATTRIBUTE HIERARCHY SYSTEM which was published Jul. 31, 1985. The Luck et al. system includes a plurality of stacks for storing data and attributes wherein only the top of the stack is loaded and utilized. The system includes an attribute memory and a character data storage, a character data counter and a position register. An attribute mask and attribute processor control loading of the attributes. A command register pushes, pops or loads to the stacks along with a sequence controller input from the attribute processor. A command decoder determines sequence of operations for loading attributes and characters into row buffers. A stack control flags when a valid load has occurred, and if no load occurred, the stack defaults and copy operation occurs.

It is herein recognized that a need exists for processing character and attribute information in a simplified manner while facilitating more sophisticated on-screen displays as described later. The present invention is directed to meeting those needs.

The principles of the invention have application to OSD systems of a type comprising a character buffer (22) containing a plurality of entries, each entry specifying one of a predetermined plurality of display characters; an attribute buffer (24) containing a plurality of entries respectively corresponding to the plurality of entries in the display character buffer, each entry specifying an attribute of the corresponding display character; and control circuitry (30, 50) for substantially simultaneously retrieving corresponding entries from the character and attribute buffers and generating a signal representing the image of the display character specified in the retrieved display character entry having the attribute specified in the retrieved attribute entry.

SUMMARY OF THE INVENTION

The present invention is characterized in that each entry in the attribute buffer (24) contains data specifying one of a plurality of entries in a palette memory (40); and said control circuitry (30,50) comprises: a character read-only memory (ROM) (30), coupled to the character buffer (22), and containing a plurality of arrays of pixels, each pixel being one of a foreground pixel or a background pixel, respectively corresponding to the predetermined plurality of display characters, for producing a signal representing a pixel in the pixel array corresponding to the display character specified by the retrieved display character entry; the palette memory (40) is coupled to the attribute buffer (24) and containing a plurality of entries specifying respective image characteristics for foreground pixels and background pixels, for producing respective signals representing the image characteristics of foreground and background pixels in the palette entry specified by the retrieved attribute entry; and a multiplexer (50), having first and second data input terminals responsive to the foreground and background pixel image representative signals from the palette memory (40), and having a control input responsive to the pixel representative signal from the character ROM (22), for producing the OSD image representative signal.

BRIEF DESCRIPTION OF THE DRAWINGS

In the drawing:

FIG. 2 is a memory layout diagram of a display character within the character ROM in FIG. 1.

DETAILED DESCRIPTION OF THE PREFERRED EMBODIMENT

Figure 1:
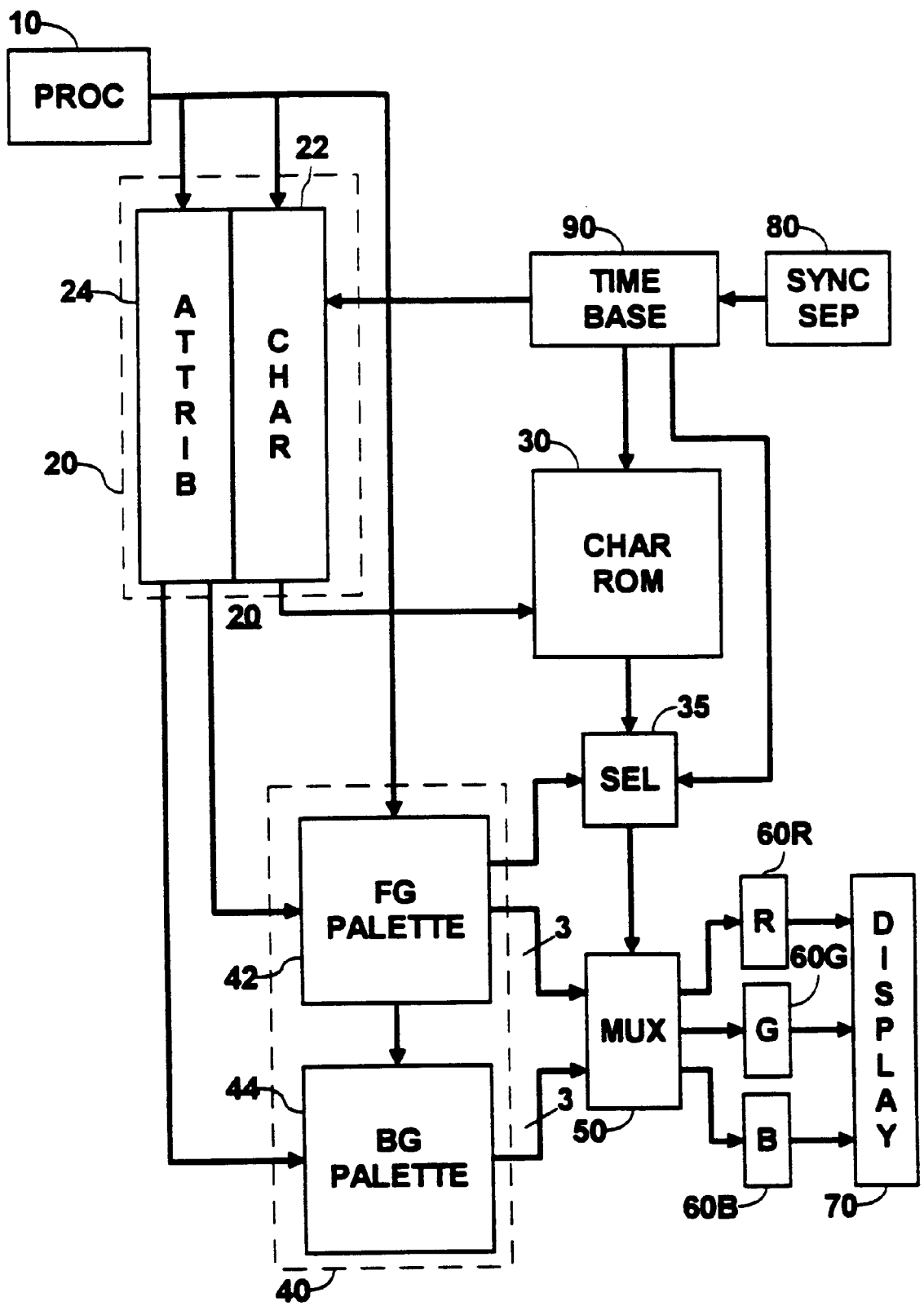
FIG. 1 is a block diagram of an on-screen display system according to principles of the present invention.

FIG. 1 is a block diagram of an on-screen display system in a television receiver according to principles of the present invention. In FIG. 1 only those elements and interconnections necessary to understand the invention are illustrated. One skilled in the art will understand what other elements are necessary, and will understand how to design, implement, and interconnect those other elements with those illustrated in FIG. 1.

In FIG. 1 a processor 10 has an output terminal coupled to respective data input terminals of a buffer RAM 20 and a palette memory 40. In the illustrated embodiment, the buffer RAM 20 is partitioned into a character buffer 22 containing data representing display characters for the OSD, and an attribute buffer 24 containing data representing attributes for the display characters. In the illustrated embodiment, the character buffer 22 and attribute buffer 24 can each contain a single line of characters consisting of up to 36 characters. A data output terminal of the display character buffer 22 is coupled to an address input terminal of a character ROM 30, and a data output terminal of the attribute buffer 24 is coupled to an address input terminal of the palette memory 40. In the illustrated embodiment, the palette memory 40 is partitioned into separate foreground (42) and background (44) palettes. Specifically, a first data output terminal of the attribute buffer 24 is coupled to an address input terminal of the foreground palette 42 and a second data output terminal of the attribute buffer 24 is coupled to an address input terminal of the background palette 44. One skilled in the art will understand that, although the RAM buffer 20, consisting of character buffer 22 and attribute buffer 24, and the palette memory 40, consisting of foreground palette 42 and background palette 44 are illustrated as being separate elements, they may coexist within a single RAM in separately addressable partitions.

A color data output terminal of the foreground palette 42, producing three component color values, is coupled to a first input terminal of a multiplexer 50, and an underline data output terminal of the foreground palette 42 is coupled to a corresponding input terminal of a select logic element 35. A color data output terminal of the background palette 42, also producing three color component values, is coupled to a second input terminal of the multiplexer 50. A data output terminal of the character ROM 30 is coupled to a second input terminal of the select logic element 35. An output terminal of the select logic element 35 is coupled to a control input terminal of the multiplexer 50. A first output terminal of the multiplexer 30, producing a first one of three color component signals, e.g. red (R), is coupled to a first digital-to-analog converter (DAC) 60R. Similarly, a second output terminal of the multiplexer 30 is coupled to a green (G) color component DAC 60G and a third output terminal of the multiplexer 30 is coupled to a blue (B) color component DAC 60B. Respective output terminals of the red, green and blue color component DACs, 60R, 60G and 60B, produce analog signals representing color component signals of the currently displayed character in the OSD image, and are coupled to corresponding input terminals of a display device 70 which may include a television receiver picture tube, for example.

The television receiver also includes a synchronization signal separator 80. Other television receiver circuitry (not shown) may include an RF/IF tuner/amplifier front end circuitry coupled to an antenna or cable distribution system; a video signal separator and video signal processing circuitry coupled to the front end circuitry; an audio signal separator and audio signal processing circuitry also coupled to the front end; and a scanning signal generator, coupled to the synchronization separator 80. These elements operate in a known manner to receive and demodulate an RF television signal, and to generate an image representative signal which is supplied to the display device 70, an audio signal which is supplied to speakers (not shown), and deflection signals which are supplied to deflection coils on the display device (also not shown) to control scanning of the display device, all in a known manner. An output terminal of the synchronization separator 80 to an output terminal of a time base 90. Respective output terminals of the time base 90 are coupled to corresponding address input terminals of the RAM buffer 20 and the character ROM 30, and to an input terminal of the select logic element 35.

In operation, the synchronization signal separator 80 extracts and processes the synchronization component from the received composite television signal, and supplies synchronization signals, such as horizontal synchronization pulses, vertical synchronization pulses, and a clock signal synchronized to the color burst, to the time base 90. The time base unit 90 includes respective counters (not shown) synchronized to the timing signals received from the synchronization signal separator 80, and maintains those counters to identify the vertical line number, and horizontal line location, currently being scanned, all in a known manner.

The processor 10 stores data representing one line of an OSD image in the RAM buffer 20. OSD display character representative data is stored in respective entries in the character buffer 22 and attribute representative data for those characters is stored in corresponding entries in the attribute buffer 24. The processor 10 can separately address and access each entry in the character buffer 22 and the attribute buffer 24. For example, the processor 10 may generate a menu which is to be displayed on the display device 70 soliciting input from the viewer via a remote control unit (not shown). Alternatively, closed captioning information may be extracted from the received television signal in a known manner, and that information supplied to the processor, which, in turn, generates an OSD to display this information on the display device 70. When this information is being stored in the RAM buffer 20 by the processor 10, only that information which is different from the previous line is rewritten. For example, if the attributes for the characters in the new line of display characters are the same as those in the previous line (the usual case), those attributes need not be rewritten.

TABLE I

| B7 | B6 | B5 | B4 | B3 | B2 | B1 | B0 |
|----|----|----|----|----|----|----|----|
| C7 | C6 | C5 | C4 | C3 | C2 | C1 | C0 |

In a first illustrated embodiment, each display character entry in the character buffer 22 is represented by an eight bit byte (see Table 1). Thus, up to 256 characters may be displayed. Each entry in the attribute buffer 24 is also an eight bit byte (see Table 1). The most significant four bit nibble (FG3FG0) contains a pointer to one of sixteen entries in the foreground palette 42, and the least significant four bit nibble (BG3BG0) contains a pointer to one of the sixteen entries in the background palette 45. The entries in both the foreground (42) and the background (44) palettes define a character's foreground and background color, respectively, and also specify attributes such as underlining.

TABLE II

| B7 | B6 | B5 | B4 | B3 | B2 | B1 | B0 |
|----|----|----|----|----|----|----|----|
| FG3 | FG2 | FG1 | FG0 | BG3 | BG2 | BG1 | BG0 |

TABLE III

| B7 | B6 | B5 | B4 | B3 | B2 | B1 | B0 |
|----|----|----|----|----|----|----|----|
|    |    | R1 | R0 | G1 | G0 | B1 | B0 |

The process 10 also writes entries into the foreground palette 42 and the background palette 44. As described above, up to sixteen foreground and sixteen background palette entries are stored in the foreground palette 42 and background palette 44 respectively. In the first illustrated embodiment, each entry in both the foreground and background palette consist of an eight bit byte. Each entry contains six bits specifying the color (foreground or background) of that entry, with two bits specifying each of the red (R1R0), green (G1G0) and blue (B1B0) color components for that color (see Table 3 for a background palette entry). Each entry in the foreground palette also includes two bits for specifying underlining (see Table 5 for a foreground palette entry).

FIG. 2 is a memory layout diagram of the image representative data for a display character within the character ROM 30 display character consists of an array of pixels having 13 rows (row 012), each row having 9 pixels (pixel 08). Each pixel is either a foreground pixel or a background pixel. This image is represented in the character ROM by a corresponding array of ROM locations, each location containing data having one of two states. For example, a foreground pixel may be represented by

TABLE IV

| B7 | B6 | B5 | B4 | B3 | B2 | B1 | B0 |
|----|----|----|----|----|----|----|----|
| U12 | U11 | R1 | R0 | G1 | G0 | B1 | B0 | logic '1' data and a background pixel may be represented by logic '0' data. The data representing the image of the character itself is contained within a subarray consisting of 9 rows (rows 19) of 8 pixels (pixel 18) substantially at the top right hand portion of the array. The remainder of the array is blank (i.e. is specified to be the background color) to provide space between characters, and between rows of characters. The storage arrangement for a single character (the character "A") is illustrated in FIG. 2 by an array of squares, each square representing one memory location in the character ROM 30. A foreground pixel is represented by an "X" within a square, and a background pixel is represented by a blank square.

Referring again to FIG. 1, respective portions of the vertical line counter and horizontal location counter (not shown) in the time base 90 address appropriate locations in the character buffer 22, the attribute buffer 24 and the character ROM 30 to extract the data specifying the OSD display character currently being displayed from the character buffer 22, its corresponding attributes from the attribute buffer 24, and the pixel of the specified OSD display character image currently being scanned from the character ROM 30, respectively (described in more detail below). In response to the foreground palette nibble at the output terminal of the attribute buffer 24 (see Table 5), one entry in the foreground palette 42 is addressed. The foreground palette 42, in turn, produces the foreground color representative signal in the addressed foreground palette entry, at its color data output terminal. The foreground palette also supplies the underlining data signal in the addressed foreground palette entry to the select logic element 35. Similarly, in response to the background palette nibble at the output terminal of the attribute buffer 24 (see Table 3), one entry in the background palette 44 is addressed. The background palette 44 produces the background color representative signal in the addressed background palette entry, at its color data output terminal.

In response to the output byte from the character buffer 22, the location within the character ROM 30 where the array containing the data representing the specified display character currently being scanned is stored (as illustrated in FIG. 2) is addressed. In response to portions of the row and pixel counters from the time base 90, the row and pixel of that addressed array currently being scanned is then produced at the data output terminal of the character ROM 30, in a known manner. The output of the character ROM 30 is a signal representing the value of the pixel currently being displayed: either foreground or background. This signal is supplied to the select logic element 35. The select logic element 35 monitors the row and pixel counters in the time base 90 to determine which rows of the display character are currently being scanned.

For the first 11 rows (row 010) of the character array (of FIG. 2) the output from the character ROM 30 is passed through the select logic element 35 to the control input terminal of the multiplexer 50. If the output signal from the character ROM 30 specifies a foreground pixel, the multiplexer 50 is conditioned to couple the color data output terminal from the foreground palette 42 to the color component DACs, 60R, 60G and 60B. If the output signal from the character ROM 30 specifies a background pixel, the multiplexer 50 is conditioned to couple the color data output terminal from the background palette 42 to the color component DACs, 60R, 60G and 60B. The analog signals produced by the DACs 60R, 60G and 60B are supplied to the display device 70, which displays the OSD image in response.

For the last two rows (rows 11 and 12) the underline data (U11 and U12, bits B6 and B7, respectively, of Table 5) from the foreground palette 42 is used to control the multiplexer 50. If row 11 is being scanned, then the select logic element 35 examines the U11 bit (B6) from the foreground palette 42. If the U11 bit is a logic '1' signal, then every pixel in row 11 is considered to be a foreground pixel. In this case, the select logic element 35 conditions the multiplexer 50 to coupled the color data output terminal from the foreground palette 42 to the color component DACs, 60R, 60G and 60B. If the U11 bit is a logic '0' signal, then every pixel in row 11 is considered to be a background pixel. In this case, the select logic element 35 conditions the multiplexer 50 to coupled the color data output terminal from the background palette 44 to the color component DACs, 60R, 60G and 60B.

If row 12 is being scanned, then the select logic element 35 examines the U12 bit (B7) from the foreground palette 42. If the U12 bit is a logic '1' signal, then every pixel in row 12 is considered to be a foreground pixel. In this case, the select logic element 35 conditions the multiplexer 50 to coupled the color data output terminal from the foreground palette 42 to the color component DACs, 60R, 60G and 60B. If the U12 bit is a logic '0' signal, then every pixel in row 12 is considered to be a background pixel. In this case, the select logic element 35 conditions the multiplexer 50 to coupled the color data output terminal from the background palette 44 to the color component DACs, 60R, 60G and 60B. By setting the underline data (U11 and U12, bits B6 and B7, respectively) in the foreground palette 42 appropriately, a thick underline (consisting of both rows 11 and 12), or a thin underline in one of two places (either row 11 or 12) may be specified.

An OSD system implemented in the manner described above allows for more sophisticated on-screen displays. Because twice as many display characters may be specified in the character buffer 22, (i.e. 255 characters, as compared to 127 for prior art versions), specialized screen icons may be stored and displayed. In addition, any one of sixteen foreground colors can be used with any one of sixteen background colors within a single character without inserting a space into the display line. The sixteen foreground colors and sixteen background colors may be independently chosen from any of 64 possible colors. Also, the ability to independently control two lines for underlining allows thicker drop shadows to be created. Flashing characters may be created by periodically changing the color in the appropriate foreground palette entry to the same color as the associated background palette entry.

TABLE V

| B11 | B10 | B9 | B8 | B7 | B6 | B5 | B4 | B3 | B2 | B1 | B0 |
|---|---|---|---|---|---|---|---|---|---|---|---|
| U12 | U11 | S | R2 | R1 | R0 | G2 | G1 | G0 | B2 | B1 | B0 |

Figure 3:
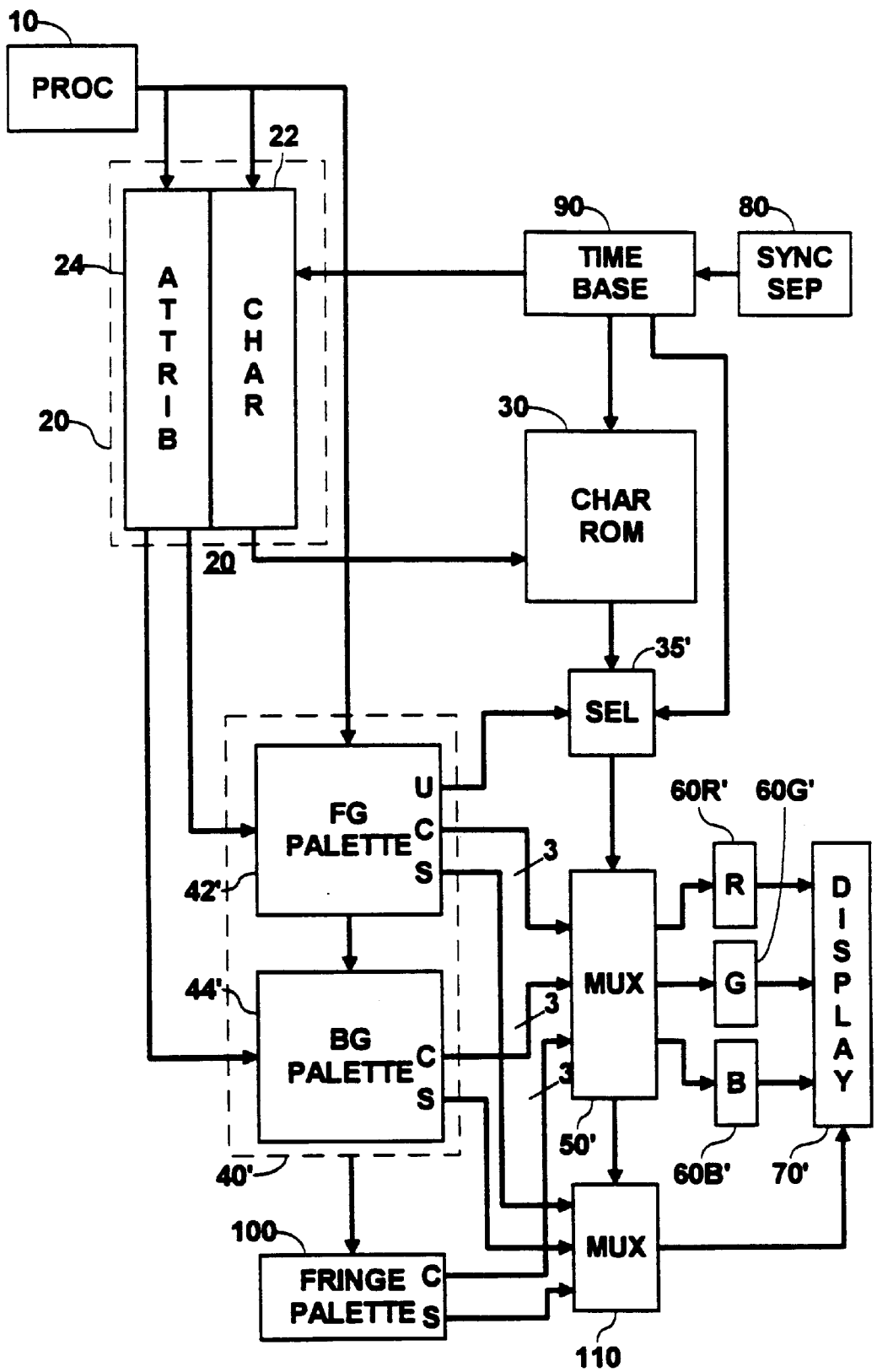
FIGS. 3 and 4 are block diagrams of alternate embodiments of an on-screen display system according to principles of the present invention.

FIG. 3 is a block diagram of an alternate embodiment of an on-screen display system according to principles of the present invention. In FIG. 3, elements which are the same as those in FIG. 1 are identified by the same reference number and are not described in detail below. In FIG. 3, each entry in the foreground palette 42' and background palette 44' has three bits allocated to each of the three color components R, G and B. This makes a total of nine bits allocated in each palette entry to define a color for 512 possible colors. The DACs 60' operate as three bit DACs, instead of two bit DACs (60, of FIG. 1), as described above. In addition, the foreground palette 42' includes two underline data bits, and a solid color indicator bit S (B9), described in more detail below (see Table 5). Thus, each entry in the foreground palette 42' includes twelve bits. The background palette 44' also includes a solid color indicator bit S (B9) (see Table 5). Thus, each entry in the background palette 44' includes ten bits.

TABLE VI

| B9 | B8 | B7 | B6 | B5 | B4 | B3 | B2 | B1 | B0 |
|---|---|---|---|---|---|---|---|---|---|
| S | R2 | R1 | R0 | G2 | G1 | G0 | B2 | B1 | B0 |

When an attribute byte is read from the attribute buffer 24, as described above, a foreground color data signal, containing three color component signals, each having three bits, is coupled from the foreground palette 42' to a first data input terminal of the multiplexer 50'. Simultaneously, a background color data signal, containing three color component signals, each having three bits, is coupled from the background palette 44' to a second data input terminal of the multiplexer 50'.

Also included in the embodiment illustrated in FIG. 3 is a fringe palette 100. The fringe palette contains a single ten bit entry identical to the entries in the background palette 44', as illustrated above in Table 5. The output terminal of the processor 10 is also coupled to a data input terminal of the fringe palette 100, and the processor 10 may store a fringe color in the fringe palette 100 in a similar manner to that for the foreground palette 42' and the background palette 44'. The fringe palette 100 produces a fringe color data signal, containing three color component signals, each having three bits, at a color data output terminal, which is coupled to a third input terminal of the multiplexer 50'.

In the OSD system illustrated in FIG. 3, the OSD image may have one of three colors: foreground and background colors, as described above; and a fringe color, e.g. for forming a border around the display area. All areas of the OSD image which are not either foreground or background areas are fringe areas. The select logic element 35' is responsive to the display character image data from the character ROM 30, and to row and pixel location data from time base 90, as described above. During times when an OSD display character is to be displayed, the select logic 35' is responsive to data from the character ROM 30 to condition the multiplexer 50' to couple the foreground color data signal from the foreground palette 42' to the DACs 60' when a foreground pixel is being scanned, and to couple the background color data signal from the background palette 44' to the DACs 60' when a background pixel is being scanned. During all other times when an OSD is to be generated (such as in a margin around the OSD image, or between display lines) the select logic element 35' conditions the multiplexer 50' to couple the color data signal from the fringe palette 100 to the DACs 60'.

The solid data bit S (B9) from the foreground palette 42' is coupled to a first input terminal of a second multiplexer 110, the solid data bit S (B9) from the background palette 44' is coupled to a second input terminal of the second multiplexer 110, and the solid data bit S (B9) from the fringe palette 100 is coupled to a third input terminal of the second multiplexer 110. The second multiplexer 110 is conditioned by the same control signal from the select logic element 35' as the first mentioned multiplexer 50'. Thus, when a foreground pixel is being displayed, the solid data bit S from the foreground palette 42' is produced at the output terminal of the second multiplexer 110, when a background pixel is being displayed, the solid data bit S from the background palette 44' is produced, and when a fringe pixel is being displayed, the solid data bit S from the fringe palette 100 is produced.

The solid data bit S produced at the output terminal of the second multiplexer 110 is coupled to a control input terminal of the display device 70'. This data bit controls the blanking of the television image signal from the received television signal (not shown). When this bit is a logic '1' signal, then the television image signal is blanked while this pixel is being displayed. This causes the OSD color being displayed (foreground, background or fringe) to appear to be a solid color. When this bit is a logic '0' signal, then the television image signal is not blanked, and is combined with the OSD image signal. In this case, the OSD color being displayed appears to be transparent, allowing the underling television image to show through. The output of the second multiplexer 110 is coupled to the blanking circuitry (not shown, but present in the display device 70), and conditions it to operate as described above.

An OSD system illustrated in FIG. 3 provides for up to sixteen independently selectable foreground and background colors selected from 512 possible colors, and one fringe color, also selected from 512 possible colors. In addition, each palette entry in the foreground palette 42', the background palette 44' and the fringe palette 100 may be specified to appear as a solid color or a transparent overlay atop the received television image. This permits extra flexibility over the OSD system illustrated in FIG. 1 with very little extra circuitry.

Figure 4:
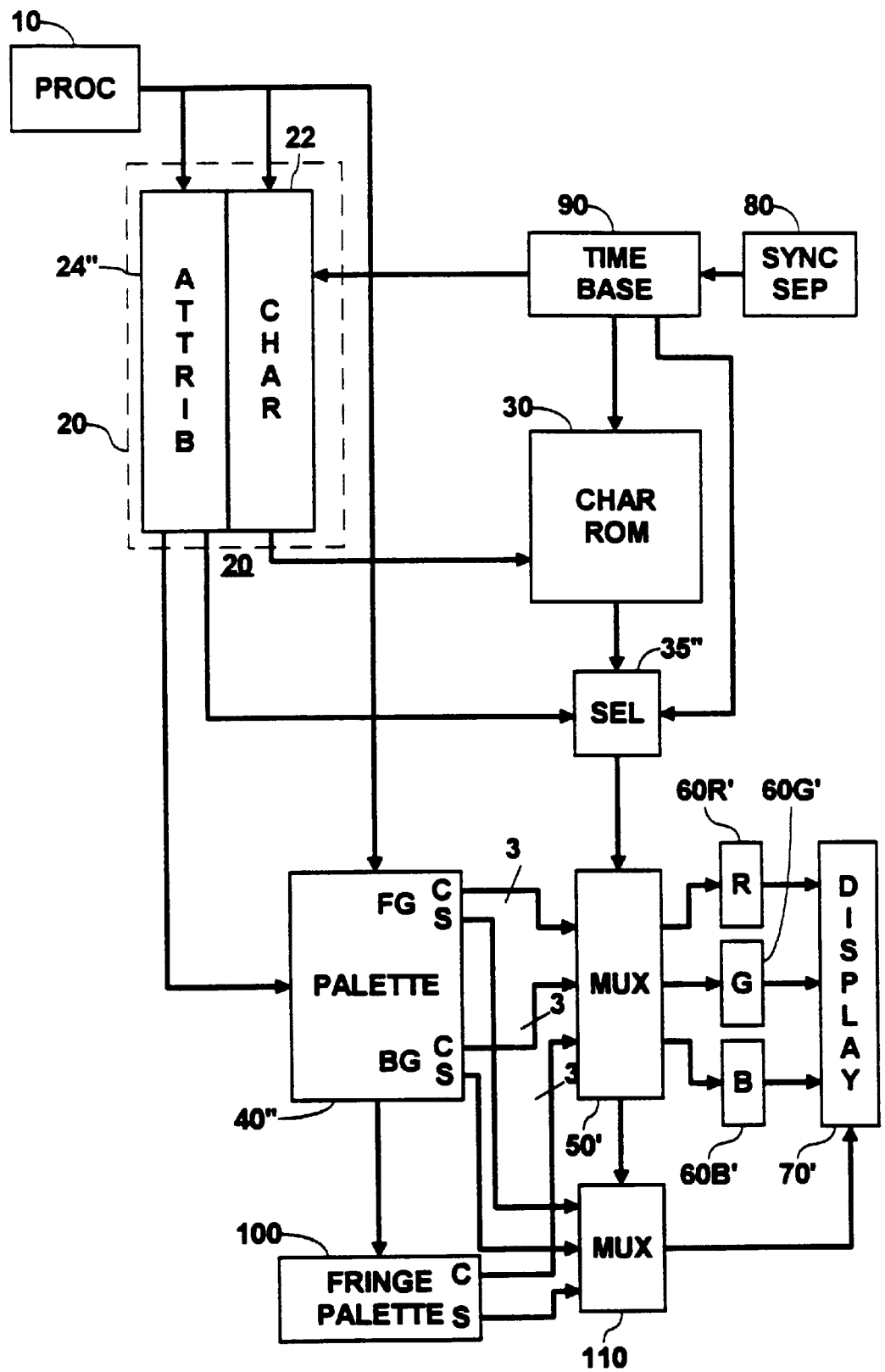

FIG. 4 is a block diagram of another alternate embodiment of an on-screen display system according to principles of the present invention. In FIG. 4, elements which are the same as those in FIGS. 1 and 3 are identified by the same reference number and are not described in detail below. In FIG. 4, a portion of the attributes for each display character represented by an entry in the character buffer 22 is contained in the corresponding entry in the attribute buffer 24" (see Table 6). Each attribute entry is represented by an eight bit byte, with one four bit nibble, P0P3 (B0B3), specifying one of sixteen palette entries, in a similar manner to that described above. The four bit nibble specifying the palette entry for the corresponding display character is coupled to an address input terminal of a palette memory 40".

However, the remaining four bit nibble specifies some attributes for the corresponding display character entry in the character buffer 22. One bit, F (B7 of Table 6), controls whether the corresponding display character is flashing; one bit, I (B6) controls whether the corresponding display character is displayed in italic (slanted); and two bits, U12 and U11 (B4B5), control the underlining for the corresponding display character in a manner similar to that described above. The four bit nibble specifying

TABLE VII

| B7 | B6 | B5 | B4 | B3 | B2 | B1 | B0 |
|----|----|----|----|----|----|----|----|
| F | I | U12 | U11 | P3 | P2 | P1 | P0 | attributes of the corresponding display character is coupled to a control input terminal of the select logic element 35".

The select logic element 35" responds to the underline data signal, U11 and U12, in the same manner described above to generate an underline for the display character specified in the corresponding entry in the character buffer 22. When the flash attribute signal, F (B7 of Table 6), is a logic '1' signal, the select logic element 35" operates to repeatedly first force all the pixels in the array containing the display character image to be background pixels (by conditioning the first multiplexer 50' to couple the background color signal output terminal from the palette 40" to the DACs 60') for a first period of time; and then restore the normal operation described above for a second period of time, all in a known manner. This creates an OSD display character which appears to flash on the screen. When the flash attribute signal, F, is a logic '0' signal, the character is displayed in the normal manner described above, and no flashing occurs.

When the italic attribute signal, I (B6 of Table 6), the select logic element 35" changes the display times of the respective rows of pixels in the array of pixels in a manner to produce an image of a character which appears to be slanted, also in a known manner. When the italic attribute signal, I, is a logic '0' signal, the character is displayed in the normal manner described above, and appears upright.

In the embodiment illustrated in FIG. 4, only a single palette 40", containing sixteen entries, is provided. Each entry in the palette 40" contains both foreground and background color data (see Table 8). Each color component in both the foreground and background color is represented by two bits, although three (or more) could also be used. Thus, six bits are allocated for the foreground color (red component: FR1&FR0 (B12B13), green component: FG1&FG0 (B10B11), and blue component FB1&FB0 (B8B9)) and the background color (red component: BR1&BR0 (B4B5), green component: BG1BG0 (B2B3), and blue component: BB1BB0 (B0B1)) within each palette entry. Each palette entry also includes a solid color data bit for the foreground FS (B14) and

TABLE VIII

| B15 | B14 | B13 | B12 | B11 | B10 | B9 | B8 |
|---|---|---|---|---|---|---|---|
|  | FS | FR1 | FR0 | FG1 | FG0 | FB1 | FB0 |
| B7 | B6 | B5 | B4 | B3 | B2 | B1 | B0 |
|  | BS | BR1 | BR0 | BG1 | BG0 | BB1 | BB0 | background BS (B6). In FIG. 4, each palette entry consists of two bytes, with foreground data in one byte and background data in the other. The fringe palette 100 contains a single one byte entry corresponding to the portion of the palette 40" entry containing the background data, which contains a color data signal C and a solid color bit S.

When the time base 90 addresses a display character entry in the character buffer 22 and a corresponding attribute entry in the attribute buffer 24", the nibble specifying the entry in the palette 40" conditions the palette to simultaneously produce: the background color data signal at the background color data output terminal BG C; the background solid data bit at the background solid data output terminal BG S; the foreground color data signal at the foreground color data output terminal FG C; and the foreground solid data bit at the foreground solid data output terminal FG S. The color data signals from the palette 40" foreground color signal output terminal, FG C, the palette 40" background color signal output terminal, BG C, and the fringe palette 100 color signal output terminal C are coupled to respective input terminals of the first multiplexer 50'. Similarly, the solid color data bits from the palette 40" foreground solid color bit output terminal, FG S, the palette 40" background solid color bit output terminal, BG S, and the fringe palette 100 solid color bit output terminal S are coupled to respective input terminals of the second multiplexer 110.

The first multiplexer 50' operates as described above with respect to FIG. 3 to supply the appropriate one of the foreground, background and fringe color signal to the DACs 60', which, in turn, supply the analog color signals to the display device 70 to generate the OSD image. Similarly, the second multiplexer 110 operates as described above to supply the appropriate one of the foreground, background and fringe solid color bit signal to the display device 70 to control the blanking of the received television image signal.

One skilled in the art will understand that other attributes for the displayed OSC characters and fringe areas may be controlled by the addition of extra bits to the foreground, background and/or fringe palettes; and/or the attribute buffer, those bits controlling appropriate circuitry in the OSD system or display device 70' to generate those attributes. For example, a bit may be included in the background palette specifying whether the background color begins at the left edge of the pixel array defining the display character, or begins in the middle of that array. One skilled in the art will also understand that other allocations of attribute control bits among the attribute buffer, and the foreground and background palettes may also be made.

What is claimed is:

1. An on-screen display system, comprising:
a character buffer containing a plurality of entries, each entry specifying one of a predetermined plurality of display characters;
an attribute buffer containing a plurality of entries respectively corresponding to the plurality of entries in the display character buffer, each entry specifying an attribute of the corresponding display character; and
control circuitry for substantially simultaneously retrieving corresponding entries from the character and attribute buffers and generating a signal representing the image of the display character specified in the retrieved display character entry having the attribute specified in the retrieved attribute entry; wherein
each entry in the attribute contains data specifying one of a plurality of entries in a palette memory; and said control circuitry comprises:
a character read-only memory, coupled to the character buffer, and containing a plurality of arrays of pixels, each pixel being one of a foreground pixel or a background pixel, respectively corresponding to the predetermined plurality of display characters, for producing a signal representing a pixel in the pixel array corresponding to the display character specified by the retrieved display character entry;
said palette memory is coupled to the attribute buffer and contains a plurality of entries specifying respective image characteristics for foreground pixels and background pixels for producing respective signals representing the image characteristics of foreground and background pixels in the palette entry specified by the retrieved attribute entry, said palette memory also containing an attribute control signal;
selector means for receiving said pixel representative signal and attribute control signal; and
a multiplexer, having first and second data input terminals responsive to the foreground and background pixel image representative signals from the palette memory, and having a control input connected to said selector for receiving either the pixel representative signal for producing the OSD image representative signal.

2. The OSD system of claim 1, wherein:
the palette memory (40) is partitioned into a foreground palette (42) containing a first plurality of entries, each entry specifying image characteristics for foreground pixels, and a background palette (42) containing a second plurality of entries, each entry specifying image characteristics for background pixels; and
the palette entry specifying data in the attribute buffer (24) contains a first portion specifying one of the first plurality of foreground palette entries, and a second portion specifying one of the second plurality of background palette entries.

3. The OSD system of claim 1 wherein:
each entry in the palette memory (40) includes data representing the color of foreground pixels and background pixels; and
the control circuitry comprises circuitry (60R,60G,60B), coupled to the output of the multiplexer (50), for generating color representative signals (R,G,B) corresponding to the specified entry in the palette memory (40).

4. The OSD system of claim 3, wherein:

the attribute control signal controls the image of the display character specified by the retrieved character buffer entry to be underlined.

5. The OSD system of claim 3, wherein:

the attribute control signal controls the image of the display character specified by the retrieved character buffer entry to flash.

6. The OSD system of claim 3, wherein:

the attribute control signal controls the image of the display character specified by the retrieved character buffer entry to be italic.

7. The OSD system of claim 1, wherein:

a processor (10), coupled to the character buffer (22), the attribute buffer (24) and the palette memory (40) for storing display character specification data in respective entries of the character buffer (22), attribute specification data in respective entries in the attribute buffer (24) and foreground and background pixel image characteristic data in the palette memory (40).

8. The OSD system of claim 1, wherein:

the control circuitry comprises circuitry for combining an image representing a television signal and the display character image representative signal, including circuitry (110,70) for selectively blanking the television image representative signal in response to a control signal; and the palette memory (40) stores foreground and background pixel image characteristic data in each entry including data for generating the control signal for the selective blanking circuitry.

9. The OSD system of claim 1, wherein:

a processor (10), coupled to the buffer (22) and the attribute buffer (24), for storing display character specification in respective entries of the character buffer (22) and attribute specification data in respective entries in the attribute buffer (24).

10. The OSD system of claim 1, wherein:

timing circuitry (80,90) responsive to a television signal, and coupled to the character buffer (22), the attribute buffer (24) and the control circuitry, for synchronizing the display character image representative signal to the television signal.

11. The OSD system of claim 10 wherein the control circuitry comprises circuitry (70') for combining an image represented by the television signal and the display character image representative signal.

* * * * *

UNITED STATES PATENT AND TRADEMARK OFFICE
CERTIFICATE OF CORRECTION

PATENT NO.   : 6,195,078B1
DATED        : February 27, 2001
INVENTOR(S)  : Aaron Hal Dinwiddie and Michael David Landis It is certified that error appears in the above-identified patent and that said Letters Patent is hereby corrected as shown below:

Claims,
Line 40, after the word "signal" insert -- or the attribute control signal --.

Signed and Sealed this

Twenty-first Day of August, 2001

*Attest:*

Nicholas P. Godici

NICHOLAS P. GODICI
*Attesting Officer*   *Acting Director of the United States Patent and Trademark Office*